June 29, 1948. C. JOHNSON ET AL 2,444,101
MEASURING AND CONTROLLING APPARATUS
Filed July 17, 1943 4 Sheets-Sheet 1

Inventors
CLARENCE JOHNSON,
HARVARD H. GORRIE, AND
PAUL S. DICKEY

By Raymond D. Jenkins
Attorney

June 29, 1948.  C. JOHNSON ET AL  2,444,101
MEASURING AND CONTROLLING APPARATUS
Filed July 17, 1943  4 Sheets-Sheet 2
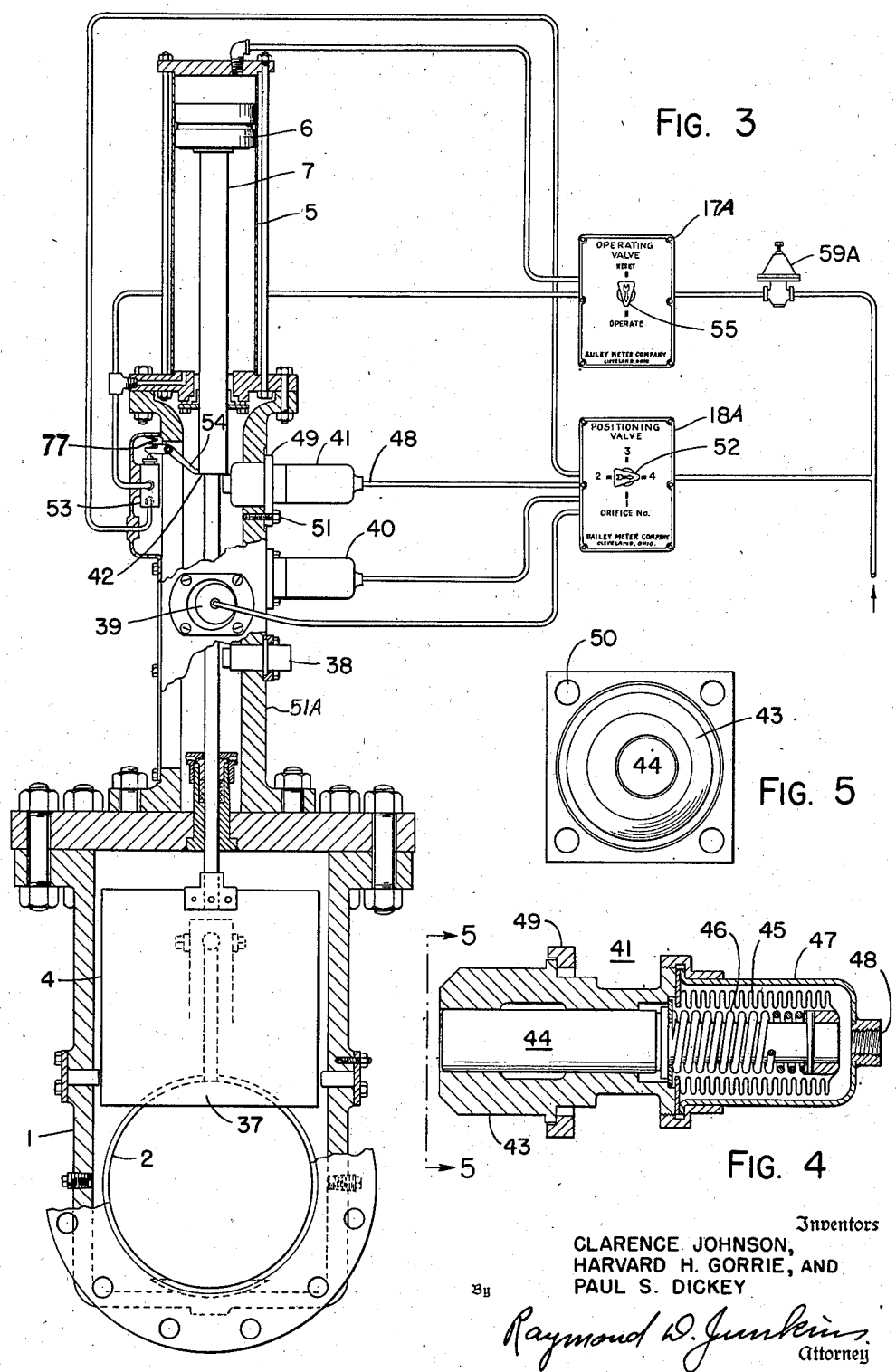
Inventors
CLARENCE JOHNSON,
HARVARD H. GORRIE, AND
PAUL S. DICKEY
By Raymond D. Junkins
Attorney

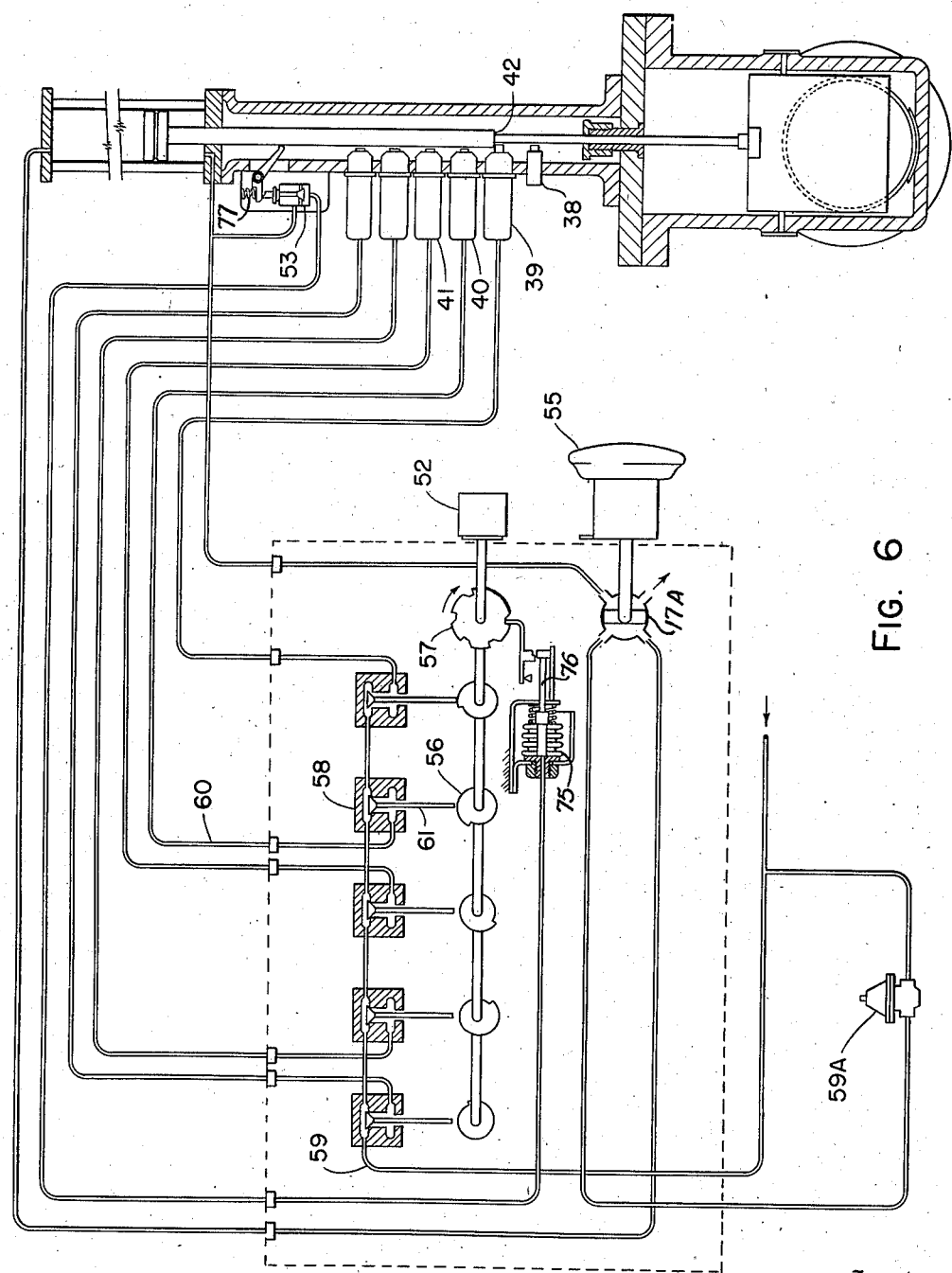

Patented June 29, 1948

2,444,101

UNITED STATES PATENT OFFICE 2,444,101

MEASURING AND CONTROLLING APPARATUS

Clarence Johnson, South Euclid, Harvard H. Gorrie, Cleveland Heights, and Paul S. Dickey, East Cleveland, Ohio, assignors to Bailey Meter Company, a corporation of Delaware Application July 17, 1943, Serial No. 495,088

15 Claims. (Cl. 138—37)

Our invention relates to fluid flow measurement, and particularly resides in improvements in adjustable orifices for creating a pressure differential which bears a definite relation to the rate of flow of a fluid through a conduit. Specifically, we provide an arrangement and means for remotely adjusting an orifice area to predetermined values.

In view of the state of the art it appears unnecessary to set forth the theory of fluid measurement inferentially from pressure differentials across a restriction in a conduit through which the fluid is flowing. Nor does it appear necessary to illustrate any of the types of meters which are responsive to such pressure differentials for indicating, recording or integrating the fluid rate of flow.

A given orifice area or percentage restriction to the fluid flow has certain flow capacity and pressure differential relations. A rate of flow meter for fluid is usually so designed as to reach a maximum at a definite value of applied differential pressure, said differential pressure being produced by the flow of a certain volume of fluid at definite density conditions past the orifice in a unit of time. A quadratic relation exists between differential pressure and rate of flow so that at low rates of flow only relatively minute differential pressures are available to actuate a flow meter or to be visually read on a manometer, and inaccuracies of metering may result. Should the rate of flow for a relatively large portion of the time be a small percentage of the ultimate maximum then it is desirable to change the rate of flow-pressure differential relation for said time by causing the given rate of flow to produce a greater differential pressure, and thus read at a higher point on the scale or graduation. Conversely, should the flow for certain periods of time be greater than that necessary to produce a maximum pressure differential to which the flow meter will respond, it is desirable to cause the given rate of flow to produce a lesser differential pressure and thus bring the readings within the range desired.

If an extremely wide range of flow rate is to be metered, then it is desirable to break the range into a number of bands so that equal accuracy of reading or of measurement may be had over different portions of the total. For example, a desired range in flow rate might be split into ten bands each covering a range of 10% of the total. A single manometer or flow meter could be used for all of the ten bands of flow rate if each such band of flow rate were able to produce the same range of differential pressures. One way of accomplishing this desideratum would be to open the conduit and change the orifice plate when it were desired to operate in another of the bands of flow rate. This is on the premise that ten orifices are available, one for each of the ten flow rates of the example.

The principal object of our present invention is the necessary arrangement and apparatus whereby the orifice opening may be readily varied without the necessity of interfering with the flowing fluid to change from one orifice plate to another. This is accomplished by providing an adjustable orifice plate positionable to provide definite predetermined flow capacity or differential pressure values.

A further object is to provide such an adjustable orifice with means for varying the orifice area accurately and speedily from a remote point.

With these and further objects in view we will now describe the embodiments of our invention which we have illustrated.

In the drawing:

Fig. 3 is an elevation, partially in section, of a modification of our invention.

Fig. 4 is a sectional detail, to larger scale, of a pneumatic stop of Fig. 3.

Fig. 5 is a view of Fig. 4 in the direction of the arrows 5—5.

Fig. 6 is a diagrammatic layout of the pneumatic control system of Fig. 3.

Figures 1, 2:
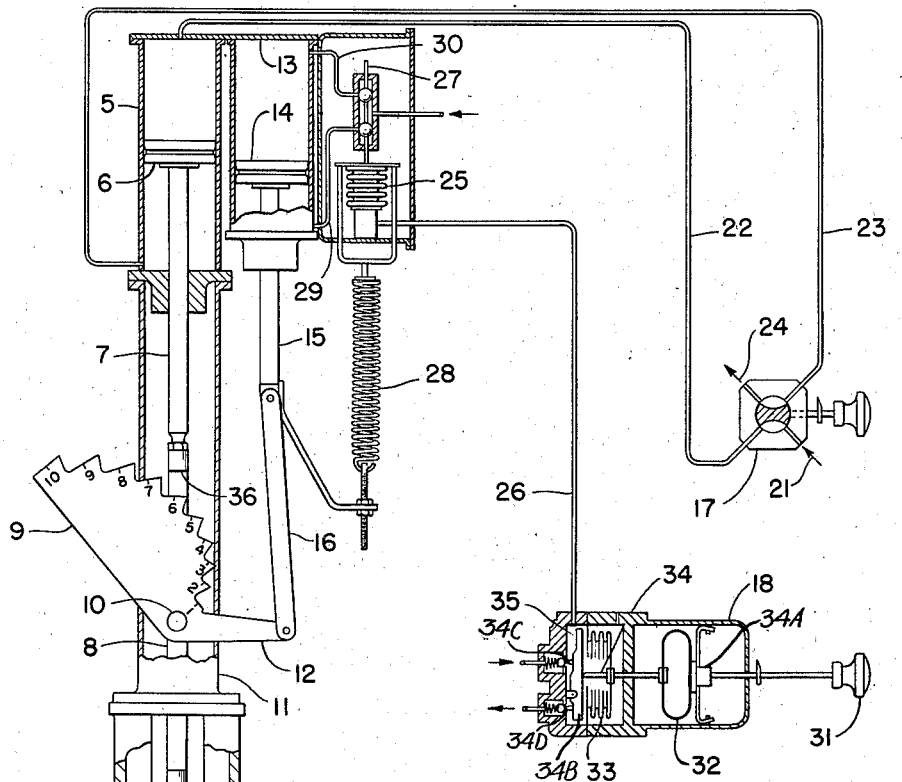
Fig. 1 is an elevation, partially in section, of a preferred embodiment of our invention, including in somewhat diagrammatic fashion interconnections with remote control stations.
Fig. 2 is a schematic showing of one of the remote control stations.

Referring now to Fig. 1, we show therein a body member 1 adapted to form a part of a conduit through which a fluid to be measured is flowing and having a bore 2 of a diameter coinciding with the opening in the conduit. Frequently it is desirable to equip the member 1 with a liner 3 of corrosion resistant material so that the area of the bore 2 adjacent the orifice plate 4 is substantially invariable. The portion of the bore 2 which is obstructed by the orifice plate 4 determines the pressure differential across said orifice plate for any given rate of flow. Inasmuch as accuracy of measurement depends upon the exactness to which the orifice plate 4 is positioned relative to the bore 2, the principal object of our invention is the provision of means through which the orifice plate 4 may be rapidly and accurately positioned to any one of a number of preselected positions and corresponding capacities. At the same time we have provided means whereby such selection of position and the positioning itself may be remotely accomplished through pneumatic or hydraulic means.

At 5 we indicate a power cylinder having a piston 6 adapted to vertically position a piston rod 7 directly connected to the orifice plate 4 through a member 8. Movable adjacent the member 8 is a member 9 pivoted as at 10 to the housing 11. The housing 11 surrounds and protects the piston rod 7 and member 8, besides providing a bearing for the pivot 10. The housing may be slotted to allow free movement of the member 9 and of its driving arm 12. For moving the member 9 we provide a power cylinder 13 having a piston 14 and piston rod 15, the latter pivotally connected to the arm 12 through a link 16.

For remote positioning of the orifice plate 4 we provide a transfer valve 17 and a selector valve 18. The transfer valve 17 has two operating positions, namely, that of Fig. 1 and that of Fig. 2, diagrammatically shown with the handle 19 adapted to move the blocking portion 20 to either of the two positions. In the position shown in Fig. 1, which we term a "normal" position, air under substantial pressure is available at the pipe 21, through the transfer valve 17 and the pipe 22, to the cylinder 5 above the piston 6 tending to urge the piston 6 in a downward direction. At the same time the pipe 23, which connects with the cylinder 5 below the piston 6, exhaust through the transfer valve 17 to the atmosphere. Thus, in the position shown, the piston 6 is urged in a downwardly direction by full air pressure on its top and with that portion of the cylinder which is below the piston 6 open to the atmosphere. With the transfer valve 17 in its "reset" position, as shown in Fig. 2, the reverse condition exists, namely, that fluid pressure from the supply line 21 is effective below the piston 6, while the other end of the cylinder 5 is exhausted to the atmosphere through the pipe 24, and the piston is urged upwardly.

The selector valve 18 constitutes a remote manual relay whereby we are enabled to establish fluid loading pressures each equivalent to, or representative of, one of the preselected positions of the orifice plate 4, or specifically one of the steps on the member 9. In other words, the selector valve 18 positions the member 9 to the selected step to which the piston rod 7 is to be moved.

The drive mechanism 13, 14 consists of a double-acting air cylinder provided with a bellows-actuated double acting air pilot valve and restoring spring which causes the piston 14 to assume a definite position for every incoming air control pressure. Thus the bellows 25 receives an air loading pressure through the pipe 26 from the selector valve 18 and positions the pilot valve 27 to a definite position corresponding thereto. The movable end of the bellows 25 is connected by means of a yoke to one end of a loading spring 28, the other end of which is positioned by and with the piston rod 15. Air pressures from the pilot valve 27 are admitted through the pipes 29 and 30 to opposite sides of the piston 14.

From a position of rest an increase in air loading pressure through the pipe 26 causes the upper end of the bellows 25 to move upwardly, thus extending the spring 28 and positioning the pilot valve 27 upwardly. Such upward positioning of the pilot 27 tends to increase the air pressure effective through the pipe 30 above the piston 14 and decrease the air pressure acting through the pipe 29 below the piston 14. This results in a downward positioning of the piston 14 with resultant downward pull on the loading spring 28 acting against the movable head of the bellows 25. The force applied by the spring upon the bellows is then proportional to drive position. If and when it is equal to that due to the incoming control air pressure within the bellows 25 the double acting pilot valve 27 is in neutral, the air pressures applied to the piston 14 are in balance and no further movement of the piston 14 takes place. Thus for each and every loading pressure applied to the bellows 25 there is a corresponding definite position of the piston 14 and of the member 9.

For establishing within the bellows 25 loading pressures corresponding to the various steps or lands of the member 9 we provide the selector valve mechanism 18 with a hand knob 31 arranged to load or unload a spring 32 and bellows 33. Fastened to the movable end of the bellows 33 and to one side of the loading spring 32 is a valve actuator 34 arranged to either admit air to the chamber 35 or to cause a discharge of air from the chamber to the atmosphere. The knob 31 is on a stem screw threaded through the block 34A into a free block which presses directly against one side of the spring 32, as shown in Fig. 1. Thus by turning the knob 31 in one direction or the other it moves toward the right or the left and thus tends to compress or release the compression of the spring 32 against the bellows 33. When the knob 31 is turned in the proper direction to compress the spring 32 and thereby load it, the resultant motion moves the beam 34B to open the inlet valve 34C and close the outlet valve 34D whereby pressure is allowed to build up in the chamber 35. Increased pressure in the chamber 35, acting within the bellows 33, causes the movable head thereof to be positioned toward the right on the drawing, carrying with it the valve actuator 34 and providing a force opposing the force of the spring 32. A condition of equilibrium is established wherein the pressure within the chamber 35 is directly related to the amount of movement of the knob 31 or of the position thereof relative to a graduated scale or dial. Thus an operator may turn the knob 31 until its pointer indicates a preselected number, as for example the number 6, which establishes a loading pressure within the chamber 35 of a preselected value resulting in a positioning of the piston 14 and thereby of the member 9 until the step or land 6 of the member is in position to limit the downward movement of the piston 6 and piston rod 7.

In general, the operation is as follows: assume the mechanism positions of Fig. 1. If air pressure is available at the pipe 21 it acts upon the top of piston 6, forcing the piston rod 7, member 8 and orifice plate 4 downwardly until the projection 36 on the member 8 engages land number 6 of the member 9. Inasmuch as the pipe 23 is open to the atmosphere through the connection 24 atmospheric pressure exists below the piston 6 and the piston will be forced downward until conditions are changed.

Assume now that it is desired to vary the orifice opening to a value represented by the step 7 on the member 9. The operator first moves the knob of the transfer valve 17 from the "normal" position of Fig. 1 to the "reset" position of Fig. 2 whereby the upper end of cylinder 5 is bled to atmosphere through pipes 22 and 24, while full air pressure from the supply pipe 21 is transmitted through the pipe 23 to the lower portion of cylinder 5, thus causing the piston 6, piston rod 7, member 8 and orifice plate 4 to be retracted to the uppermost limit of travel.

As soon as the member 8 has been retracted (upwardly on the drawing) from possible engagement with the member 9, then the operator positions the knob 31 of the selector valve 18 until the pointer is in agreement with the numeral 7. This loads the spring 32, increases the loading pressure within the pipe 26 and bellows 25, causing an upward positioning of the pilot 27 and an extension of the spring 28. Such upward movement of the pilot 27 results in an increase in pressure through the pipe 30 above the piston 14 and a decrease in pressure through the pipe 29 below the piston 14. This results in a downward movement of the piston 14, a loading of the spring 28 to counterbalance the increased pressure within the bellows 25 and a return of the pilot 27 to neutral position. At the same time the downward movement of the piston rod 15 has resulted in a clockwise positioning of the member 9 around its pivot 10, and the arrangement is such that the pilot 27 reaches its neutral position at exactly the time that the member land number 7 is in the axial line of member 8. The pilot 27 having reached its neutral position the loading pressures effective through the pipes 29 and 30 are equal, stopping travel of the piston 14, and the land 7 remains in line with the member 8.

The transfer valve 17 is then turned to its "normal" position (see Fig. 1) wherein full pressure is effective above the piston 6, causing the piston to move downwardly until the projection 36 of the member 8 engages the land number 7 and is held in such engagement so long as full pressure is applied above the piston 6 and the cylinder 5 below the piston 6 is exhausted to the atmosphere.

If it is desired to move the orifice plate 4 to any position corresponding to a land on the member 9 it is in general only necessary, first, to retract the piston 6 and the member 8 to their uppermost extent of travel. Second, to position the member 9, through the agency of the selector valve 18, until the desired member land is located in line of the member 8; and third, to cause the member 8 to move downwardly until its projection 36 engages the selected land and is held in such engagement which corresponds to the orifice plate 4 being in the selected position.

In Fig. 3 we show another embodiment of our invention. Herein the body member 1 has been shown at 90° to the showing of Fig. 1 so as to more clearly indicate the segment 37 of the bore 2 which is blocked off by the orifice plate 4 in one of its preselected positions. A piston 6, having a piston rod 7, is positionable in a power cylinder 5 for moving and holding the orifice plate 4. The orifice plate 4 has four preselected positions as determined by the stops 38, 39, 40 and 41. Fig. 4 is a sectional elevation of one of the stops 39, 40, or 41, and Fig. 5 is a view of Fig. 4 looking in the direction of the arrows 5—5. The stop 38 differs from the stops 39, 40 and 41 in that it is a permanently located stop of minimum travel of the piston rod 7 and does not have the extendible retractible mechanism of the stops 39, 40 and 41.

In general, the arrangement of Fig. 3 provides that the orifice plate 4 may be positioned through the agency of the piston 6 in a downwardly direction until the shoulder 42 on the piston rod 7 engages the first one of the stops 41, 40, 39 or 38 which it finds in an extended position. In Fig. 4 we indicate that a housing 43 has slidable therein a plunger 44 adapted to be extended toward the left (on the drawing) through the agency of a bellows 45 acting against a loading spring 46 when pressure is applied to the interior of the bellows housing 47 through a pipe connection 48. When pressure within the pipe 48 is released then the spring 46 overcomes the bellows 45 and retracts the plunger 44 to the position shown in Fig. 4.

In Fig. 5 we indicate that the plunger 44 is eccentric within the housing 43 and that the entire assembly is held against the upright 51A by the clamping action of an encircling plate 49 having a plurality of bolt holes 50 through which are applied the necessary bolts 51. The purpose of this arrangement is of course so that slight adjustment of vertical location of the stop plunger 44 may be had by loosening the bolts 51 and slightly rotating the assembly including the eccentrically bored housing 43, thus slightly raising or lowering the plunger 44, and correspondingly slightly varying the area of the segment 37 when the shoulder 42 engages the end of the plunger 44.

In this arrangement we provide a transfer valve 17A and a selector valve 18A somewhat similar to those indicated in Figs. 1 and 2. The selector valve 18A consists of a series of cam-operated shutoff valves 58 (Fig. 6), each of which is connected to one of the stop assemblies 39, 40 or 41. The cams 56 operating these valves are in turn rotated on a common shaft by the knob 52 relative to numerals indicating the four stops.

The transfer valve 17A is similar to that described in connection with Figs. 1 and 2. The valves 17A and 18A are interlocked one with the other so that it is impossible to operate the knob 52 of the selector valve 18A until the orifice plate 4 is fully retracted to its uppermost position (on the drawing) in the orifice body. This is accomplished as follows: An interlock valve 53 is attached to the orifice upright or superstructure 51A in such a way as to remain closed until the orifice plate is fully retracted. At this point the valve arm 54 is positioned under the shoulder 42 of the piston rod 7, and the arm 54 (through the force of spring 77) in turn pushes down the interlock valve stem and opens the valve 53 (Fig. 6). This interlock valve 53 is connected to the bellows 75 of the interlock mechanism in the selector valve 18A. As the air pressure is thus impressed upon the bellows 75 of this interlock mechanism the stem 76 attached to it moves longitudinally, thus disengaging from a lock wheel 57 on the cam shaft. With this wheel unlocked the knob 52 can be turned to any desired capacity stop, such as 39, 40 or 41, indicated on the dial of valve 18A as 2, 3, 4. While we have indicated in Fig. 3 that the valves 17A and 18A are separate, it is equally feasible that they be combined into a single operable mechanism.

We provide a pressure reducing valve 59A in the air pipe leading to the transfer valve 17A as we have found it desirable to actuate the piston 6 with air at approximately 20 p. s. i. pressure, while the air available to hold the plungers 44 extended should perhaps be at 50 p. s. i. pressure.

The proper sequence of operation of this system is as follows:

1. Turn the knob 55 to "reset" position. This retracts the orifice plate to its maximum opening position in the bore 2.

2. Turn the knob 52 to the capacity stop desired, i. e., 1, 2, 3, or 4. This pushes out the corresponding stop pin so as to engage the shoulder 42 of the piston rod 7 when the orifice plate 4 is lowered into the body.

3. Turn the knob 55 to "operate" position. This lowers the orifice plate 4 to the desired position and engages the shoulder 42 of the pison rod 7 with the extended stop pin previously selected.

This entire cycle of operation normally takes not more than six to twelve seconds, depending upon the relative position of the stop selected, the existing position of the orifice plate and the size of the orifice.

The lowest stop 38 is not air operated but is fixed in position. When the knob 52 is turned to this designation (1) all shutoff valves 58 are closed so that no stop pins are extended toward the piston rod. When the knob 55 is turned to the "operate" position the orifice plate moves down until the shoulder 42 engages the fixed stop. Thus the sequence of operation is precisely the same as outlined above regardless of the fact that the lowest or fixed stop is not air operated.

In Fig. 6 we have shown a diagrammatic layout of the pneumatic control system of Fig. 3 with the various piping connections to the transfer valve and selector valve. Through the agency of the knob 55 of the transver valve 17A the piston rod and orifice plate are retracted to their uppermost position (on the drawing) and then the selector knob 52 is turned to the numeral designating the selected orifice capacity (travel stop). By turning the knob 52 the cams connected thereto actuate the shutoff valves, as clearly shown in Fig. 6, so that the selected stop is extended into the path of the shoulder 42 of the piston rod and held in that position. The transfer valve 17A is then turned to the "operate" position which moves the piston, piston rod and orifice plate downwardly until the shoulder 42 on the piston rod engages the selected stop. Thereafter air pressure on the top of the piston holds the shoulder 42 firmly against the selected stop until it may be desired to make a further change.

It will be seen that when the knob 52 is turned in the proper direction the cam 56 is rotated in a rising direction, and when the selected notch of the wheel 57 is reached the cam 56 corresponding thereto has reached its highest position of rise and has lifted and opened the shutoff valve 58. This allows high pressure air from the supply pipe 59 to be admitted to the pipe 60 and act upon the bellows 45 of the stop 40 to extend the plunger 44 into the path of the shoulder 42. The mere fact that certain other of the valves may be opened through cam action while the knob 52 is being turned harms nothing because even though various other stops are successively extended into the path of the shoulder 42, they will be individually retracted by the action of their individual springs 46 as soon as the respective cam has passed beyond its highest point and the respective valve 58 has returned to closed position.

It will be apparent that when the valve 58 has again seated and has shut off the supply of air from the pipe 59 to the pipe 60 then full air pressure is trapped within the pipe 60 and the bellows 45 so that the stop pin 44 would stay in its extended position although it were desired that the spring 46 retract it out of the way of the shoulder 42. To prevent this we have provided that sufficient clearance is allowed around the valve stems 61 so that there is a continuous minute bleed to the atmosphere regardless of the position of the valve 58. Thus there is a minute bleed even when the valve 58 is open and full line pressure is applied to the pipe 60. This bleed, with the valve 58 closed, allows a relief of the pipe 60 so that the spring 46 will retract the plunger 44 in sufficient time to have it out of the way of movement of piston rod 7 and its shoulder 42.

Figure 7:
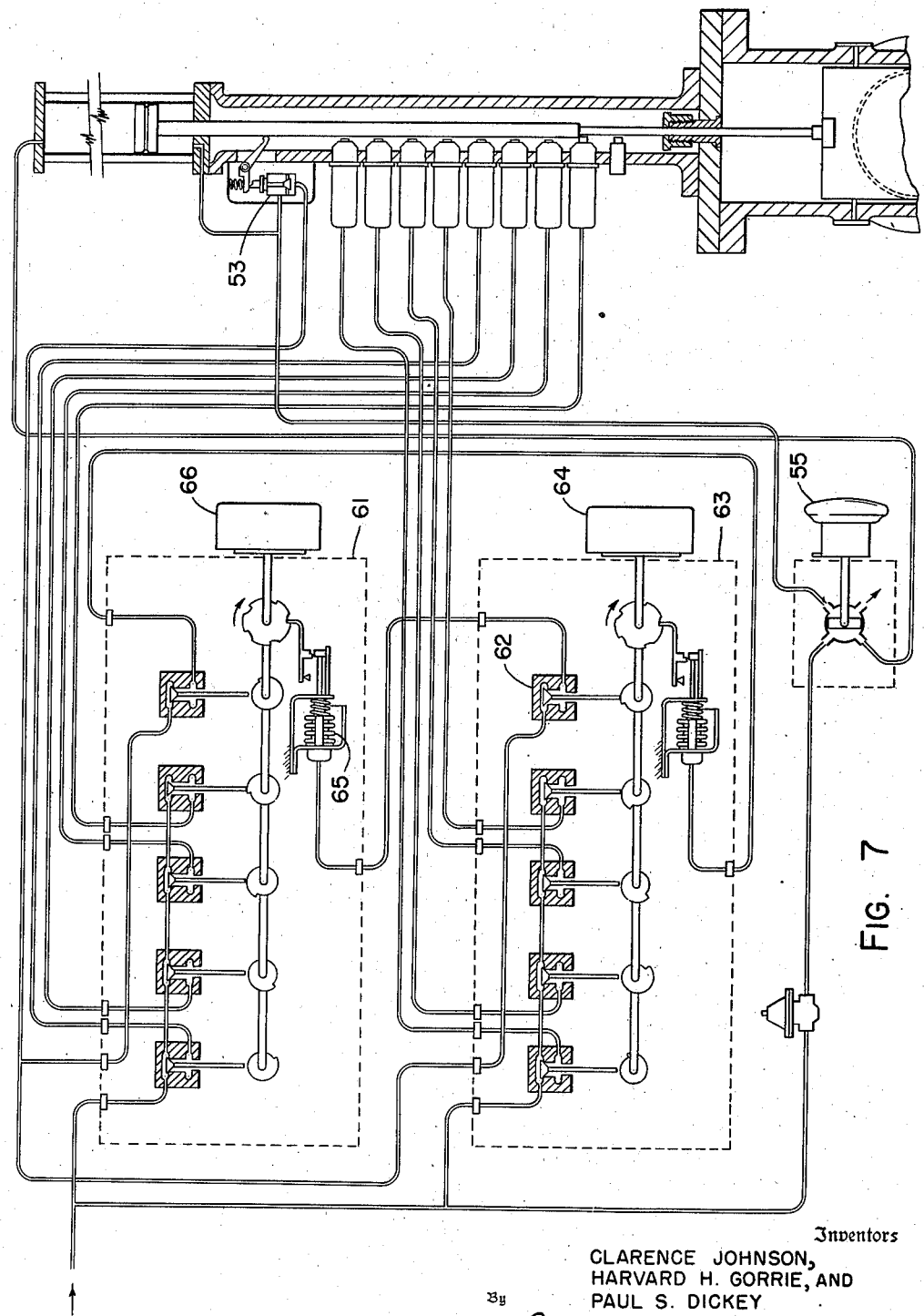
Fig. 7 is a diagrammatic layout of a pneumatic control system similar to that of Fig. 6 but adapted for a larger number of positions.

In Fig. 7 we show a diagrammatic layout of a pneumatic control system similar to that of Fig. 6 but having a greater number of stops in connection with an adjustable orifice. For example, when the desired number of stops is greater than a certain number it is extremely difficult or impossible to include them all physically in a single selector valve. Beyond this number two or more selector valves may be used and then it becomes necessary to properly interlock the transfer valves and the various selector valves so that the proper preselected stop is the only one which is extended to limit or control the position of the orifice plate, and furthermore that none of the stops may be extended into the path of motion of the shoulder 42 to interfere with travel of the piston rod and orifice plate on its way to the selected position.

The individual position selectors are similar to the position selector valve of Fig. 6. In addition, however, a shutoff valve is incorporated in the circuit of the interlock mechanism in each selector valve to make it impossible to operate either position selector until the other selector is in the off position. This is accomplished as follows:

Suppose that one of the positions included in selector valve 61 is to be used. Air cannot pass through the interlock valve 62 in the selector valve 63 until the selector knob 64 is in a predetermined position. When this knob is so positioned then the air passes through the interlock valve 62 and to the bellows of the interlock mechanism 65. This releases the motion of the cam shaft of the system 61 and permits the knob 66 to be turned to the desired stop designation when the orifice plate is fully retracted.

This system is interlocked with the position of the adjustable orifice itself exactly as previously explained, referring to the interlock 53, so as to make it impossible to turn either of the selector knobs 64 or 66 until the orifice is fully retracted. The only difference in sequence of operation of this system as compared to the one shown on Fig. 6 is the setting of the knob 64 or 66, which is not being used, to the "off" position.

In sequence it is first advisable to turn the transfer knob 55 to the "reset" position, then turn the knob 64 or 66 which is not to be used to the "off" position, and then turn the other knob either 66 or 64 to the indicated stop position desired. Thereafter to return the knob 55 to the "operate" position.

In general, we have provided an adjustable orifice adaptable to remote positioning, so that an operator at a remote point may select the orifice capacity or orifice position which he desires to utilize in the measurement of a flowing fluid and accomplish a positioning of the orifice plate to the selected position swiftly and accurately without the necessity of interfering with the flow of the fluid in any respect.

It is apparent that it is not necessary that this system be pneumatically actuated, but it might equally as well be a hydraulic system utilizing oil or other fluid as may be desired. Such particular details or changes in the mechanism to adapt the system for other than pneumatic actuation appear immaterial.

What we claim as new, and desire to secure by Letters Patent of the United States, is:

1. The combination with an adjustable orifice system having a flow restricting element adapted for movement relative to a flowing fluid for creating thereby a pressure differential bearing a known relation to rate of fluid flow, of a fluid pressure power means arranged to move said element between extreme limits, and fluid pressure operated means engageable by said power means and providing a plurality of positionable intermediate travel limits for said power means.

2. The combination of claim 1 including manually operable means for selecting the intermediate travel limit and controlling the flow of pressure fluid to said fluid pressure operated means for limiting the travel of said power means and the amount of restriction to fluid flow to be exerted by said element.

3. The combination of claim 1 wherein the means providing a plurality of positionable intermediate travel limits for said power means comprises a member having a plurality of lands engageable with said power means for limiting the travel of the power means in one direction.

4. The combination of claim 1 wherein the means providing a plurality of positionable intermediate travel limits for said power means comprises a series of extendible-retractible stops movable selectively into the path of said power means for limiting the travel of the power means in one direction.

5. The combination of claim 1 wherein the positionable intermediate travel limits of said power means comprises a member having a plurality of lands engageable with said power means for limiting the travel of the power means in one direction, and means for remotely selectively moving said member until a desired land is in the path of the power means.

6. The combination of claim 1 wherein the means providing a plurality of positionable intermediate travel limits for said power means comprises a series of extendible-retractible stops movable by pressure fluid into the path of said power means for limiting the travel of the power means in one direction, and means including remotely located manually actuated means for supplying pressure fluid selectively to said stops and positioning a desired one of said stops in the path of the power means.

7. The combination with an adjustable orifice system having a flow restricting element adapted for movement relative to a flowing fluid for creating thereby a pressure differential bearing a known relation to rate of fluid flow, and power means arranged to position said element between extreme limits, of a member adjacent the travel path of said power means and having a plurality of lands thereon each providing a limit to travel of said power means in one direction, and separate power means for positioning said member to bring a preselected land into operative relation with the first power means.

8. The combination of claim 7 including manually actuated remote means for selecting the desired limit of travel of said first power means and for then controlling the separate power means to position said member.

9. The combination of claim 7 wherein the separate power means for positioning the member is a fluid pressure actuated power means, and a manually actuated selector means is provided for establishing a fluid loading pressure corresponding to the desired travel limit for the element and applying said loading pressure to said separate power means.

10. The combination of claim 7 wherein the separate power means for positioning the member is a fluid pressure actuated power means, and manually actuated selector means is provided for selecting the desired limit of travel of said first power means and for then controlling the separate power means to position said member, and manually actuated means is also provided for controlling the movement of the first power means toward and away from the member.

11. The combination with an adjustable orifice system having a flow restricting element positionable transversely across a flowing fluid for creating thereacross a pressure differential bearing a known relation to rate of fluid flow, of a pneumatic power piston connected to position said element between extreme limits of travel, the improvement therewith of means providing intermediate limits of travel for the element, pneumatic means for making effective a selected one of the intermediate travel limits, and means for supplying pressure fluid to said power piston for moving it in one direction until it reaches said selected limit.

12. The combination with an adjustable orifice system having a flow restricting element positionable across a fluid flow path for creating a pressure differential bearing a known relation to rate of fluid flow, of a pneumatic power piston connected to position said element between extreme limits of travel, a member having a plurality of lands each providing an intermediate travel limit for said piston and element, means for supplying air under pressure to said piston, remote manually actuated valve means for controlling said air supply means to effect movement of said piston relative to said limits of travel, a second pneumatic power piston connected to position said member to bring a selected travel limit land into engageable relation with said first piston, means for supplying air under pressure to said second piston, and remote manually actuated valve means for controlling said last mentioned air supply means.

13. The combination with an adjustable orifice system having a flow restricting element positionable across a fluid flow path for creating a pressure differential bearing a known relation to rate of fluid flow, of a pneumatic power piston connected to position said element between extreme limits of travel, a plurality of extendible-retractable means each providing when extended an intermediate travel limit for said piston and element, means for supplying air under pressure to said piston, remote manually actuated valve means for controlling said air supply means to effect movement of said piston relative to said limits of travel, and means including remote manually actuated selector means for selecting a desired intermediate travel limit and thereafter causing the corresponding one of the extendible-retractable means to be extended and limit the travel of the piston and element.

14. The combination of claim 13 wherein the extendible-retractable means are fluid actuated, and the means including the selector means also including means for supplying pressure fluid to said extendible-retractable means, and valve means for directing flow selectively to said extendible-retractable means for extending the same into the path of said piston and element assembly.

15. The combination of claim 13 including means for preventing actuation of said selector means until the power piston has been retracted to one extreme limit of travel.

CLARENCE JOHNSON.
HARVARD H. GORRIE.
PAUL S. DICKEY.

REFERENCES CITED

The following references are of record in the file of this patent:

UNITED STATES PATENTS

| Number | Name | Date |
|---|---|---|
| 1,287,273 | Fisher | Dec. 10, 1918 |
| 1,580,678 | Roucka | Apr. 13, 1926 |
| 1,580,679 | Roucka | Apr. 13, 1926 |
| 1,754,868 | Wehling | Apr. 15, 1930 |
| 2,055,539 | Jacoby et al. | Sept. 29, 1936 |
| 2,189,475 | Saur | Feb. 6, 1940 |
| 2,192,714 | Norman et al. | Mar. 5, 1940 |
| 2,213,663 | Berard | Sept. 3, 1940 |
| 2,319,336 | McCullough | May 18, 1943 |